United States Patent [19]

Yamada et al.

[11] 4,253,553

[45] Mar. 3, 1981

[54] CONTROL APPARATUS FOR AN OIL PRESSURE OPERATED TRANSMISSION IN AUTOMOTIVE VEHICLE

[75] Inventors: Yoji Yamada, Kawagoe; Sadanori Nishimura, Omiya; Takeyuki Shimizu, Kamifukuoka; Masakazu Maezono, Omiya, all of Japan

[73] Assignee: Honda Giken Kogyo Kabushiki Kaisha, Tokyo, Japan

[21] Appl. No.: 74,304

[22] Filed: Sep. 11, 1979

[30] Foreign Application Priority Data

Sep. 14, 1978 [JP] Japan ................ 53-112179

[51] Int. Cl.³ .................. F16D 25/10; B60K 41/16
[52] U.S. Cl. .................. 192/3.62; 192/87.19; 192/.076; 192/103 R; 74/869
[58] Field of Search ............ 192/87.12, 87.13, 87.19, 192/87.18, 87.15, 87.14, 103 R, 3.27, .076, 109 F, 3.61, 3.62; 74/869

[56] References Cited

U.S. PATENT DOCUMENTS

| | | | |
|---|---|---|---|
| 3,004,447 | 10/1961 | Sand | 192/.076 X |
| 3,722,646 | 3/1973 | Oguma | 192/.076 X |
| 4,033,201 | 7/1977 | Sakai | 192/109 F |
| 4,046,033 | 9/1977 | Hashimoto et al. | 74/869 |
| 4,186,627 | 2/1980 | Kuramochi | 74/869 |

*Primary Examiner*—George H. Krizmanich
*Attorney, Agent, or Firm*—Haseltine and Lake

[57] ABSTRACT

The present invention discloses a control apparatus for an oil pressure operated transmission in an automotive vehicle. The apparatus comprises a transmission with at least two stages of low speed and high speed forward driving trains and it is so arranged that, in an automatic shift range of a manual valve connected through first oil passage to an oil pressure source, low speed and high speed oil pressure clutches are selectively supplied with pressure oil through a shift valve in communication with the manual valve through a second oil passage. In a hold range of the manual valve, the valve is interposed between the low speed oil pressure clutch and the shift valve means for dividing the oil passage into third oil passage on its upstream side and fourth oil passage on its downstream side, having no communication between third and fourth passage and establishing a communication between fourth and first oil passage without through the shift valve means. At the same time the communication between first and second oil passage is disrupted.

5 Claims, 6 Drawing Figures

CONTROL APPARATUS FOR AN OIL PRESSURE OPERATED TRANSMISSION IN AUTOMOTIVE VEHICLE

BACKGROUND OF THE INVENTION

The present invention relates to control apparatus for an oil pressure operated transmission in automotive vehicles, inclusive of cars and trucks.

Representative controlling apparatus known in the prior art includes a transmission with at least two stages of low speed and high speed forward driving trains, and it is so arranged that, in an automatic shift range of a manual valve interposed in an oil pressure circuit for the transmission, low speed and high speed oil pressure clutches interposed in the respective forward driving trains may be selectively supplied through a shift valve with pressure oil, and in a hold range of the manual valve, only the low speed oil pressure clutch is supplied with the pressure oil, with the shift valve being kept on its low speed side. This conventional apparatus, however, has such drawbacks that, if the shift valve is locked on its high speed side due to its engagement with dust or the like, the low speed oil pressure clutch cannot be supplied with the pressure oil in both of the automatic shift range and the hold range, resulting in difficulty of starting a vehicle. Further, an engine brake operation and others by using the low speed forward driving train cannot be obtained.

Thus, a need of an apparatus capable of supplying oil pressure to the clutches in all the conditions has long existed in the prior art.

Accordingly, the present invention can be viewed as an effort to fill the need which has long existed for an appropriate control apparatus for oil pressure operated transmission in an automotive vehicle.

SUMMARY OF THE INVENTION

The present invention discloses a control apparatus for an oil pressure operated transmission in an automotive vehicle. The apparatus comprises a transmission with at least two stages of low speed and high speed forward driving trains and it is so arranged that, in an automatic shift range of a manual valve connected through first oil passage to an oil pressure source, low speed and high speed oil pressure clutches are selectively supplied with pressure oil through a shift valve in communication with the manual valve through a second oil passage, in a hold range of the manual valve, the valve is interposed between the low speed oil pressure clutch and the shift valve for dividing the oil passage into third oil passage on its upstream side and fourth oil passage on its downstream side, having no communication between third and fourth passage and establishing a communication between fourth and first oil passages without through the shift valve. At the same time the communication between first and second oil passages is disrupted.

The apparatus further comprises a backward driving train having same low speed oil pressure clutch and a selector for providing changeover movements between a forward running side and a backward running side. The manual valve is arranged in such a way that in its reverse driving range R, the fourth oil passage is in communication with the first oil passage without through the shift valve.

It is an object of the present invention to provide a trouble free control apparatus capable of controlling an oil pressure operated transmission in an automotive vehicle at all speeds.

It is another object to provide improved apparatus which may work even if a shift valve is locked on its high speed side due to its engagement with a dust or any foreign substance.

DETAILED DESCRIPTION OF THE INVENTION

Figure 1:
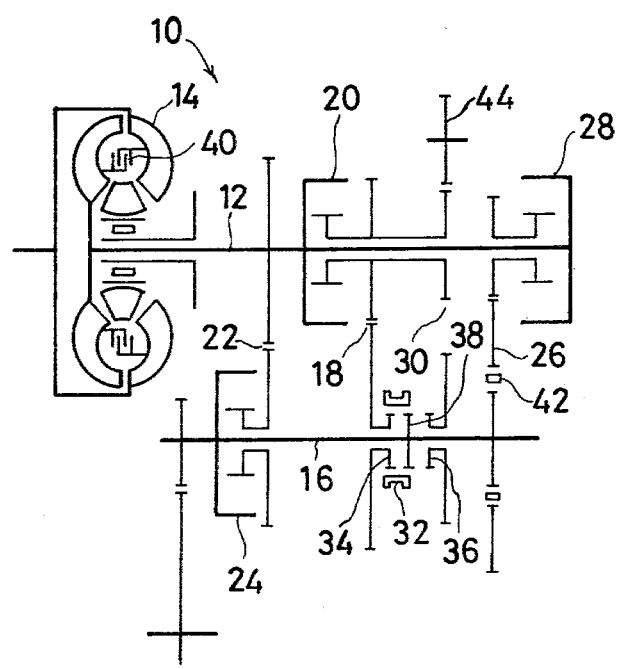
FIG. 1 is a schematic representation illustrating an apparatus of the present invention in combination with a transmission of a vehicle.
Figure 2:
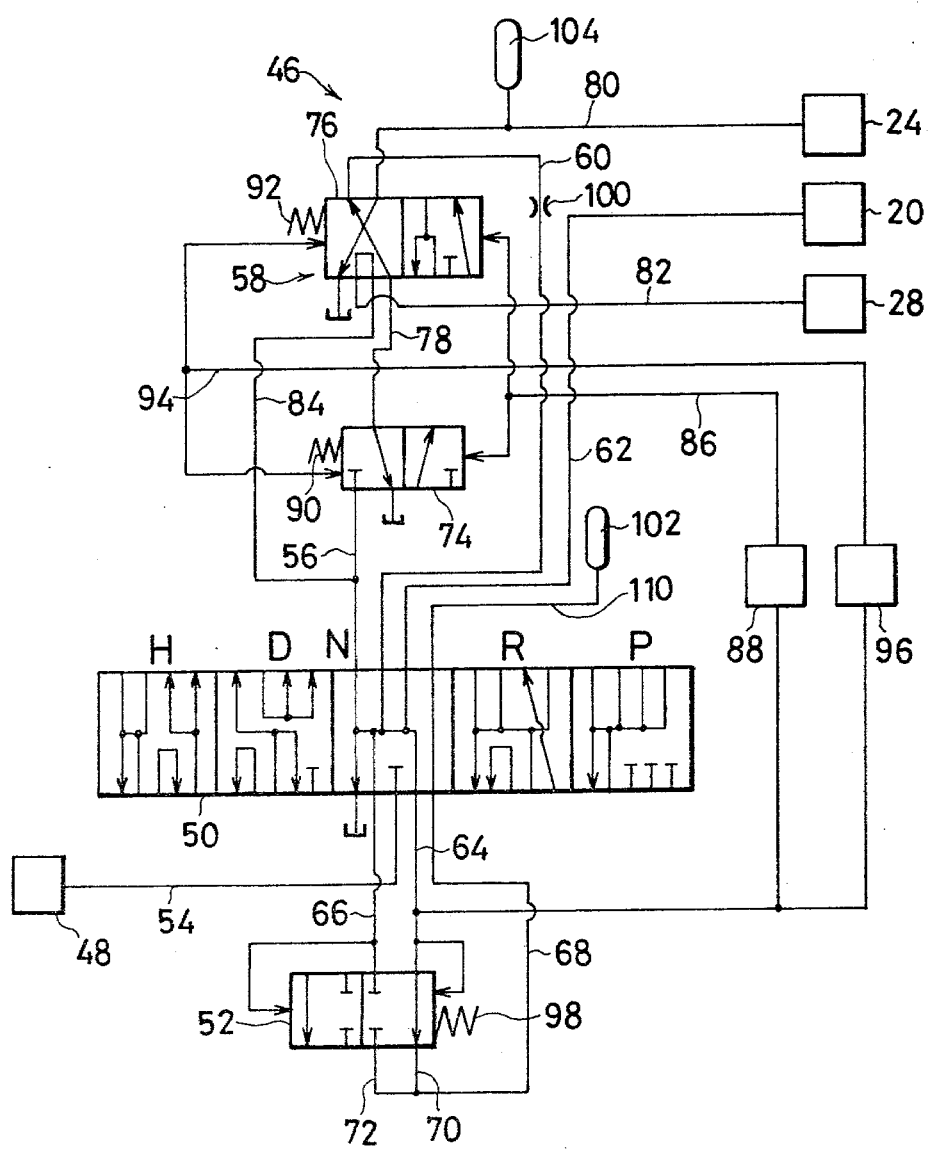
FIG. 2 is an oil pressure circuit diagram illustrating an operation of the apparatus with a manual valve being in its neutral range 'N'.
Figure 3:
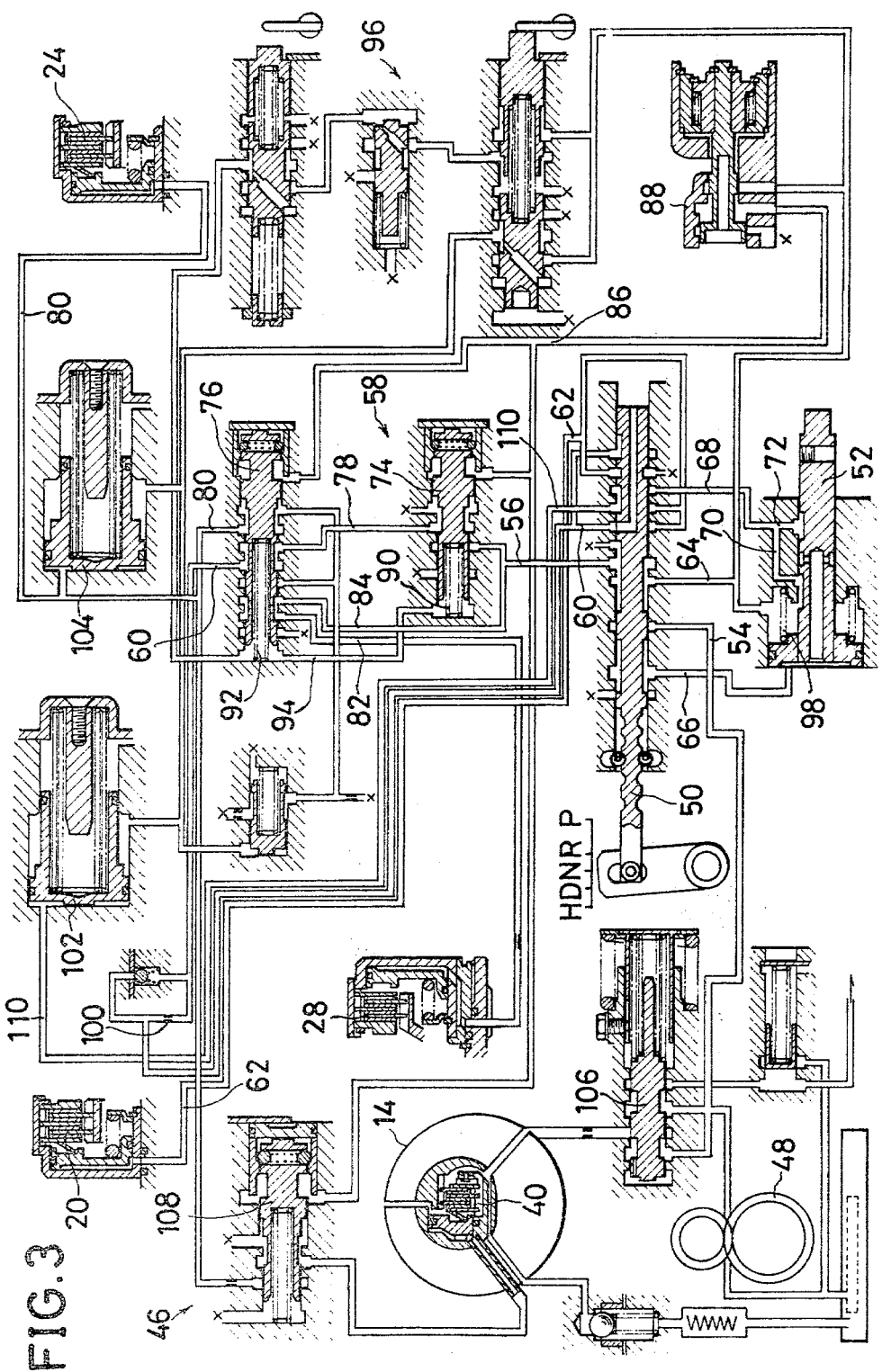
FIG. 3 is a perspective view of the apparatus as illustrated in FIG. 2.

With reference to FIG. 1, numeral 10 denotes a transmission, and the transmission 10 is so constructed that, between an input shaft 12 connected through a torque convertor 14 to an internal combustion engine, not shown, and an output shaft 16 connected to a load such as wheels, not shown, there are provided a second speed forward driving train 18 of relatively low speed ratio in which there is interposed a second speed oil pressure clutch 20 on the input shaft 12, a third speed forward driving train 22 of high speed ratio, in which there is interposed a third speed oil pressure clutch 24 on the output shaft 16, a first speed forward driving train 26 of the lowest speed ratio, in which there is interposed a first speed oil pressure clutch 28 on the input shaft 12 and a reverse driving train 30 in which there is used the second speed oil pressure clutch 20, which is also used for the second speed forward driving train 18. Further the transmission is so constructed that the second speed forward driving train 18 and the reverse driving train 30 may be selectively established through a selector 32 arranged to be given changeover movements between its forward running side on the left in the drawings and its backward running side on the right for selectively connecting idle gears 34 and 36 on respective end portions of those trains to a gear 38 on the output shaft 16.

A direct coupling clutch 40 is built in the torque convertor 14, a one-way clutch 42 is interposed in the first speed forward driving train 26, and a reverse idler gear 44 is interposed in the reverse driving train 30.

The oil pressure clutches 20, 24, 28 and the selector 32 are controlled in their operations by an oil pressure circuit 46 as shown in FIGS. 2 to 6. The oil pressure circuit 46 is provided with an oil pressure source 48, a manual valve 50 which can be changed over by a manual operation into 5 ranges comprising a hold range H, an automatic shift range D, a neutral range N, a reverse range R and a parking range P, a shift valve means 58 which is shiftable for supplying the pressure oil selectively to the oil pressure clutches 20, 24, and 28 in response to a vehicle speed and a throttle open degree, and a servo valve 52 for a changeover between forward running and backward running sides for effecting the changeover operation of the selector 32.

The manual valve 50 is so constructed as to control connecting relations between a first oil passage 54 connected to the oil pressure source 48, a second oil passage 56 connected to an inlet side of the shift valve means 58, third and fourth oil passages 60 and 62 comprising the upstream side and the downstream side of an oil passage connecting between an outlet side of the shift valve means 58 and the second speed oil pressure clutch 20, a pair of fifth and sixth oil passages 64 and 66, which are connected to an inlet side of the servo valve 52, and a ninth oil passage 68 connected to seventh and eighth oil passages 70 and 72 on an outlet side of the servo valve 52. All these oil passages are intended to be changed over and connected, as described hereinafter, in respective ranges of the manual valve 50.

The shift valve means 58 comprises first and second valves 74, 76 on the upstream side and the downstream side which are connected in series through an intermediate connecting passage 78 and connected to the second oil passage 56. The second valve 76 selectively connects the connecting passage 78 to the third oil passage 60 or a tenth oil passage 80 connected to the third speed oil pressure clutch 24 and selectively connects twelfth oil passage 82 communicated with the first oil pressure clutch 28 to an eleventh oil passage 84 branched from the second oil passage 56.

The first and the second valves 74 and 76 are arranged to be applied at their respective one ends, through a thirteenth oil passage 86 with a governor pressure substantially corresponding to a vehicle speed from a governor valve 88 and applied at the other ends with respective resilient forces of springs 90 and 92 and with a throttle pressure substantially corresponding to a throttle open degree through a fourteenth oil passage 94 from a throttle valve 96. Consequently, at the time of a low vehicle speed, with a low governor pressure, the first and the second valves 74 and 76 are moved to the right, and the eleventh oil passage 84 and the twelfth oil passage 82 are interconnected, and thereby the shift valve means 58 is brought in such a first speed position that supply of pressure oil to the first oil pressure clutch 28 is effected. As the vehicle speed is increased, the governor pressure is increased and thereby, the first valve 74 is moved to the left, and the second oil passage 56 is connected through the connecting passage 78 and the second valve 76 to the third oil passage 60, so that the shift valve means 58 is changed over to such a second speed position that supply of pressure oil to the second speed oil pressure clutch 20 is effected. Subsequently, the second valve 76 is also moved to the left, and the connecting passage 78 is connected to the tenth oil passage 80, so that the shift valve 58 is changed over to such a third speed position that supply of oil pressure to the third speed oil pressure clutch 24 is effected.

When the shift valve means 58 is in the second speed position, the eleventh oil passage 84 and the twelfth oil passage 82 are remained in their interconnected condition and consequently release of the first oil pressure clutch 28 is not effected. However, in this case a power transmission through the first speed forward driving train 26 is prevented by the one-way clutch 42 interposed in the first speed forward driving train 26.

The servo valve 52 is so biased by a spring 98 as to be positioned at the left-hand sided forward running position in order to give a changeover movement to the selector 32 to the forward running side, and consequently operates so that the fifth oil passage 64 connected to the first oil passage 54 in the H range and in the D range of the manual valve 50 is connected through the seventh oil passage 70 to the ninth oil passage 68. By supply of pressure oil to the sixth oil passage 66 connected to the first oil passage 54 in the R range of the manual valve 14, the servo valve 52 is moved to the right-hand sided backward running position in order to give a changeover movement to the selector 32 to the backward running side against the action of the spring 98, and consequently operates so as to connect the sixth oil passage 66 to the ninth oil passage 68 through the eighth oil passage 72.

A first damper member 100 comprising an orifice and a second damper member 102 comprising an accumulator are connected, individually, to the third oil passage 60 and the fourth oil passage 62 in order to damp abrupt rising and lowering of the oil pressure at the time of oil supply to and discharge from the second speed oil pressure clutch 20. In this arrangement the accumulator 102 is connected to the fourth oil passage 62 through a subsidiary passage 110 and the manual valve 50, so that, in the N range and the R range of the manual valve 50, the connection between the fourth oil passage 62 and the subsidiary passage 110 and, accordingly, the accumulator 102 may be cut off.

Further, the orifice 100 may be so modified that the same is provided in the second oil passage 56 or the connecting passage 78.

An accumulator 104 serves as a damper member connected to the tenth oil passage 80 for damping abrupt rising and lowering of oil pressure at the time of oil supply to and oil discharge from the third speed oil pressure clutch 24. A regulator valve 106 is provided for adjusting the pressure of the pressure oil from the oil pressure source 48 to a pressure substantially corresponding to a stator reaction force of the torque convertor 14 and for supplying the adjusted pressure oil to the torque convertor 14 and the first oil passage 54. A control valve 108 is provided for the direct coupling clutch 40.

Figure 4:
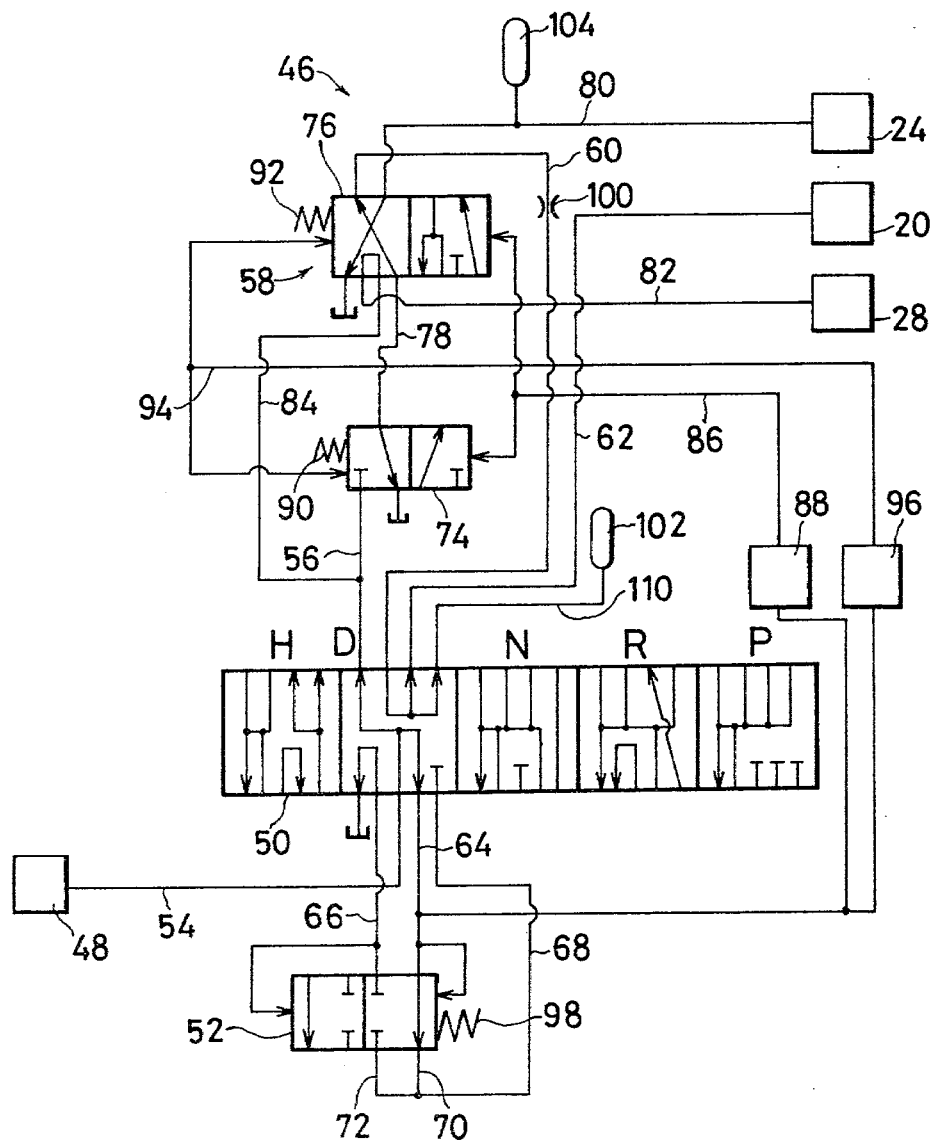
FIG. 4 is an oil pressure circuit diagram illustrating an operation of the apparatus with a manual valve being in its automatic shift range 'D'.

In operation, if the manual valve 50 is in the D range, as shown clearly in FIG. 4, the first oil passage 54 is in communication with the second oil passage 56 and the fifth oil passage 64. As the second valve 58 is, first, in the first speed position, the eleventh oil passage 84 diverged from the second oil passage 56 is connected to the twelfth oil passage 82, so that the first oil pressure clutch 28 is supplied with the pressure oil, and thus a forward driving of the vehicle at the fist speed ratio by the establishment of the first speed forward driving train 26 is effected. When the vehicle speed is increased, the shift valve means 58 is given a changeover movement to the second speed position, and the second oil passage 56 is connected through the connecting passage 78 to the third oil passage 60. The third oil passage 60 is connected through the manual valve 50 to the fourth oil passage 62, whereby the pressure oil is supplied to the second speed oil pressure clutch 20, and thus the second speed forward driving train 18 is established by the cooperation thereof with the selector 32 previously changed over to its forward running side by means of the servo valve 52 by supply of the pressure oil to the fifth oil passage 64, therefore a forward driving of the vehicle at the second speed ratio is effected.

The rapid rising of supply oil pressure to the second speed oil pressure clutch 20 can be prevented by the orifice 100 and the accumulator 102 connected to the third oil passage 60 and the fourth oil passage 62, and this results in a decrease change speed shock.

If the vehicle speed is further increased, the shift valve means 58 is changed over to the third speed position, and thereby the connecting passage 78 previously connected to the second oil passage 56 is connected to the tenth oil passage 80. A forward driving of the vehicle at the third speed ratio is effected by the establishment of the third speed forward driving train 22 by supplying the oil to the third speed oil pressure clutch 24.

Figure 5:
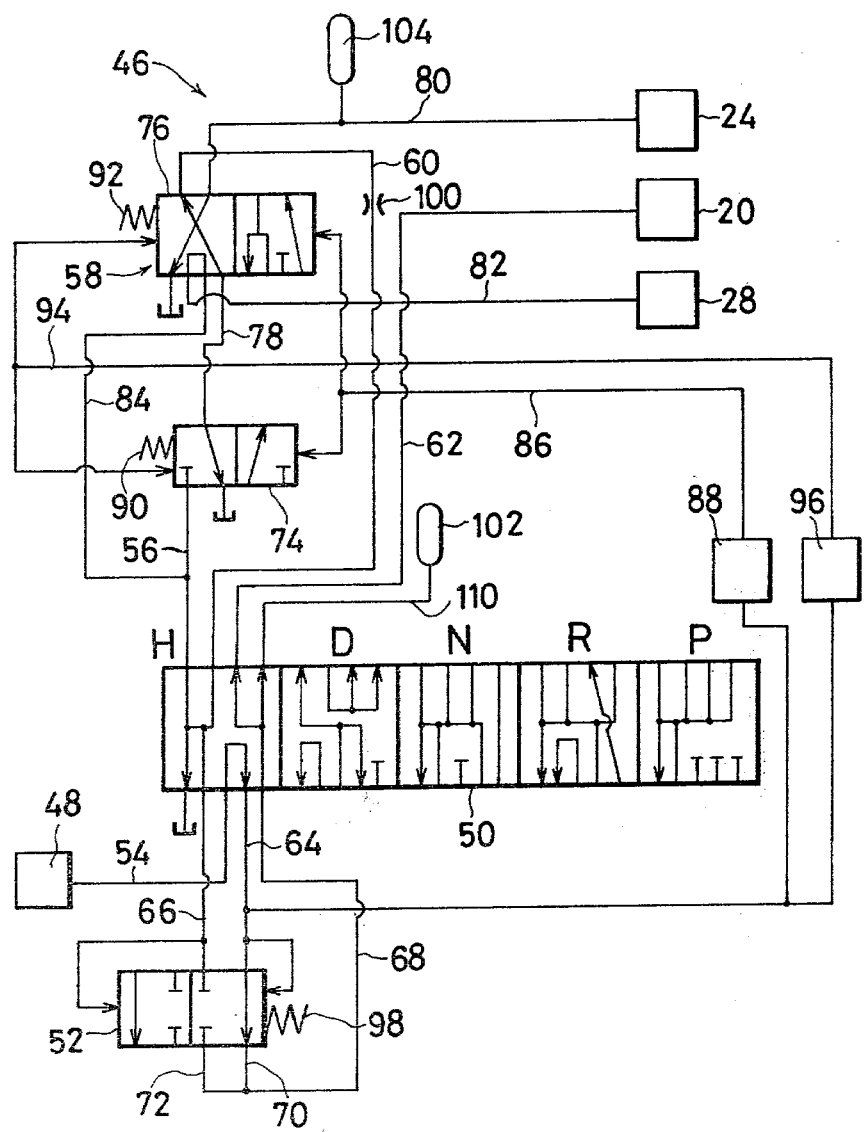
FIG. 5 is an oil pressure circuit diagram illustrating an operation of the apparatus with a manual valve being in its hold range 'H'.

If, under this condition, the manual valve 50 is changed over to the H range for obtaining an engine brake or the like, as shown in FIG. 5, the connection between the first and the second oil passages 54 and 56 is disrupted, the third oil pressure clutch 24 is released, and at the same time the connection between the third and the fourth oil passages 60 and 62 is disrupted. The fourth oil passage 62 is connected to the ninth oil passage 68. The ninth oil passage 68 is connected through the seventh oil passage 70, the servo valve 52 and the fifth oil passage 64 to the first oil passage 54 in almost the same manner as in the case of the D range, and consequently the pressure oil can be supplied to the second oil pressure clutch 20 without passing through the shift valve means 58, and thus there is effected a driving of the vehicle only through the second speed forward driving train 18.

Therefore, even if there occurs such a trouble that the shift valve means 58 is locked at the third speed position, there can be obtained an engine brake operation by the second speed forward driving train 18.

In this connection, the conventional apparatus is so defective that on such a lock occasion as above, even in either of the D range or the H range of the manual valve, thwe third speed oil pressure clutch alone can be supplied with pressure oil, and consequently the start driving of the vehicle becomes difficult.

According to this invention apparatus, whereas, the second speed oil pressure clutch 20 can be supplied with the pressure oil, by moving the manual valve 50 to the H range, and consequently the start driving of the vehicle by the second speed forward driving train 18 can be given.

Furthermore, at the time of oil supply to the second speed oil pressure clutch 20 in the H range of the manual valve 50, there takes place such a comparatively abrupt rising of the pressure thereof because of only the damping action of the accumulator 102 alone connected to the fourth oil passage 62. This abrupt rising acts so advantageously as to prevent the vehicle from an idle running caused by delay in engagement of the second speed oil pressure clutch 20, and also acts so advantageously as to prevent an excessive change speed shock.

Figure 6:
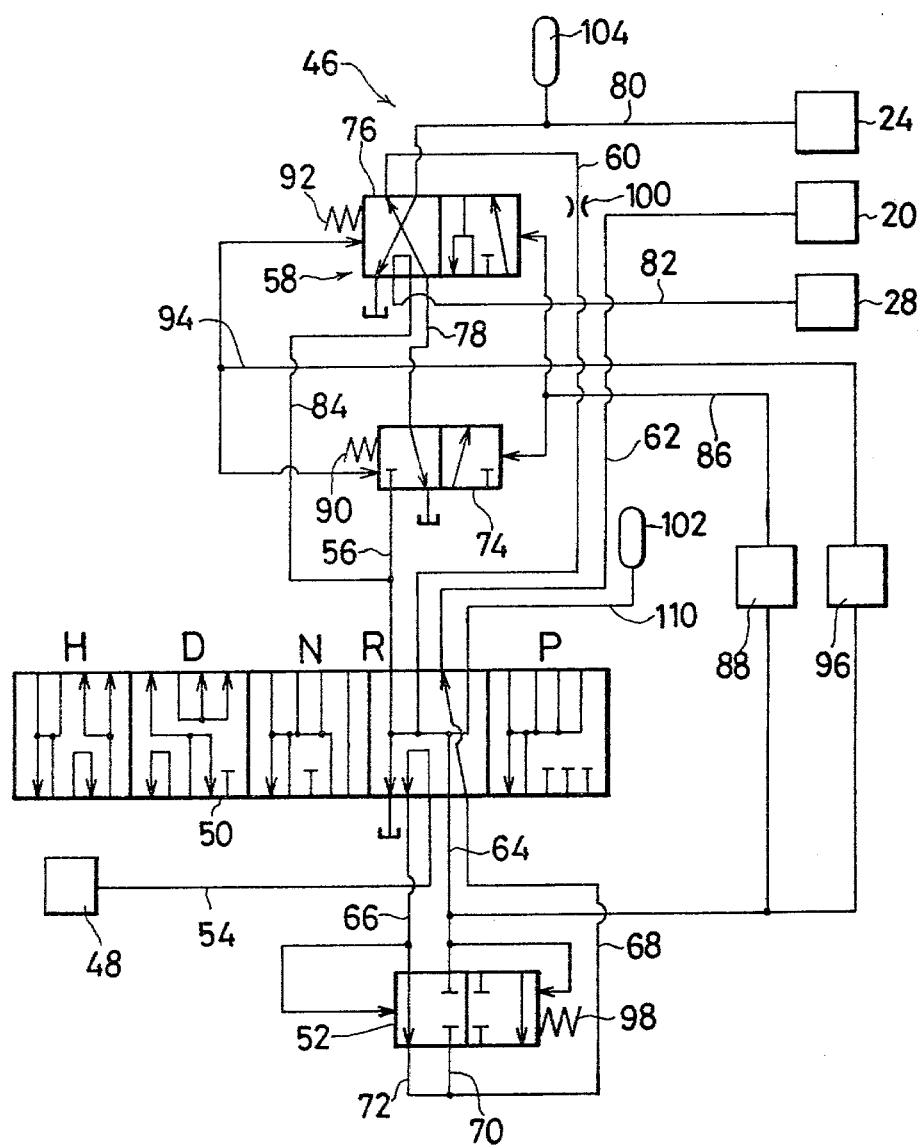
FIG. 6 is an oil pressure circuit diagram illustrating an operation of the apparatus with a manual valve being in its reverse range 'R'.

If, thereafter, the manual valve 50 is changed over to the R range, as shown in FIG. 6, the first oil passage 54 is connected to the sixth oil passage 66, and thereby the servo valve 52 is given a slide movement to its backward running position as mentioned before, so that the selector 32 is changed over to the backward running side. Further, the sixth oil passage 66 is connected through the servo valve 52 and the eighth oil passage 72 to the ninth oil passage 68 connected through the manual valve 50 to the fourth oil passage 62, and consequently the second speed oil pressure clutch 20 is supplied with the pressure oil, and there is given a reverse driving of the vehicle by the resultant establishment of the backward driving train 30.

In such a case that the manual valve 50 is changed over to the R range from the forward driving at the second speed in the D range of the manual valve 50 in order to give immediately the reverse driving, if the accumulator 102 is remained connected to the fourth oil passage 62, even though the fourth oil passage 62 be made open to the atmosphere in the N range of the manual valve 50, the second speed oil pressure clutch 20 would be delayed in release by the accumulator 102, so that a power transmission to the idle gear 34 of the second speed forward driving train 18 cannot be stopped immediately, and accordingly the changeover movement of the selector 32 to the backward running side in the R range cannot be effected smoothly, and there is resulted in an unexpected forward driving of the vehicle.

According to the preferred embodiment of the present invention the connection between the fourth oil passage 62 and the accumulator 102 is disrupted in the N range and the R range of the manual valve 50. Consequently, on opening of the fourth oil passage 62 to the atmosphere in the N range, the second speed oil pressure clutch 20 is immediately released, so that there can be given a smooth changeover movement of the selector 32 in the R range and also there can be given a rapid engagement of the second oil pressure clutch 20. Accordingly, the backward driving train 30 is immediately established.

Thus, according to this invention, in the hold range of the manual valve, the pressure oil from the oil pressure source is arranged to be supplied to the low speed oil pressure clutch without passing through the shift valve means. Further, even when the shift valve means is locked at the high speed position, the low speed forward driving train can be established without failure in the hold range, and the drawbacks in the conventional apparatus can be overcome.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A control apparatus for an oil pressure operated transmission in automotive vehicle, comprising:
   (a) an oil pressure source;
   (b) a plurality of oil pressure passages comprising a first oil passage, a second oil passage, a third oil passage and a fourth oil passage;
   (c) at least low speed and high speed forward driving trains;
   (d) low speed and high speed oil pressure clutches interposed in said low speed and high speed forward driving trains;
   (e) shift valve means for supplying the pressure oil selectively to said oil pressure clutches; and
   (f) a manual valve operable in a plurality of ranges comprising a hold range H, an automatic shift range D, a neutral range N, a reverse range R and a parking range P;

said manual valve connected through said first oil passage to said oil pressure source, said manual valve interposed between said low speed oil pressure clutch and shift valve means for dividing the oil passage into said third oil passage on its upstream side and said fourth oil passage on its downstream side, wherein, in said automatic shift range D of the manual valve, said low speed and high speed oil pressure clutches are selectively supplied with pressure oil through the shift valve means connected through said second oil passage to said manual valve, and wherein, in said hold range of the manual valve, the communication between said third oil passage and said fourth oil passage is disrupted, said fourth oil passage is in communication with said first oil passage without through shift valve means, and at the same time the communication between said first oil passage and said second oil passage is disrupted.

2. The apparatus as recited in claim 1, further comprises a first damper member and a second damper member to damp abrupt rising and lowering of the oil pressure at a time of oil supply to and oil discharge from said low speed oil pressure clutch interposed in said second or third oil passage and said fourth oil passage, respectively.

3. The apparatus as recited in claim 2, wherein said first damper member is an orifice.

4. The apparatus as recited in claim 2, wherein said second damper member is an accumulator.

5. The apparatus as recited in claim 1, further comprises a backward driving train using said low speed oil pressure clutch in common with said low speed forward driving train, and a selector for providing changeover movements between a forward running side and a backward running side for selectively establishing said driving trains, and wherein said manual valve is arranged in such a way that in its reverse driving range R changed over from said automatic shift range D through said neutral range in which said fourth oil passage is opened to atmosphere, and said fourth oil passage is in communication with said first oil passage without through said shift valve means and the communication between said second damper member and said fourth oil passage is disrupted.

* * * * *